GAS-COOLED FAST REACTOR
Filed March 28, 1967 2 Sheets-Sheet 1
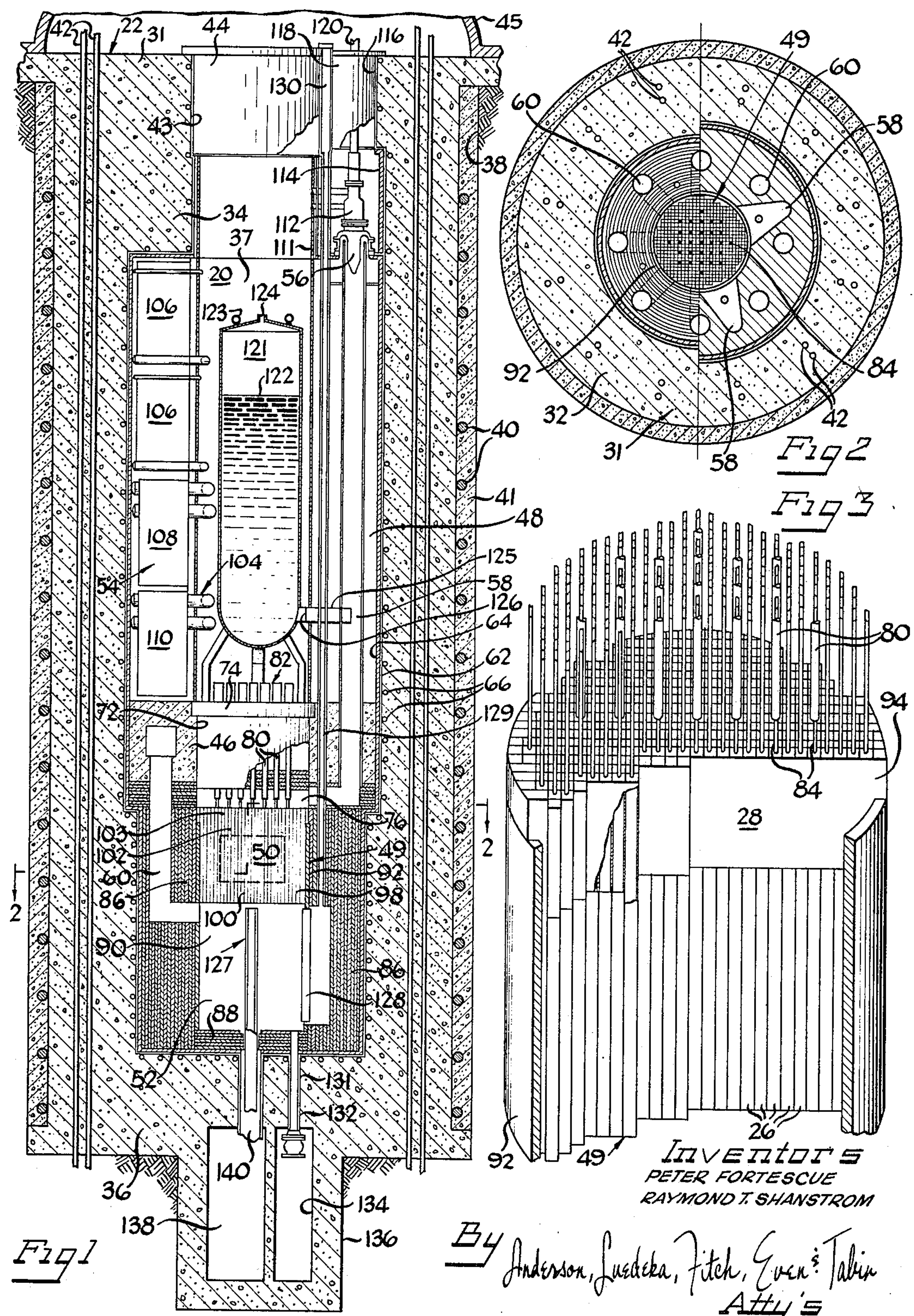

Oct. 28, 1969 P. FORTESCUE ET AL 3,475,272
GAS-COOLED FAST REACTOR
Filed March 28, 1967 2 Sheets-Sheet 2
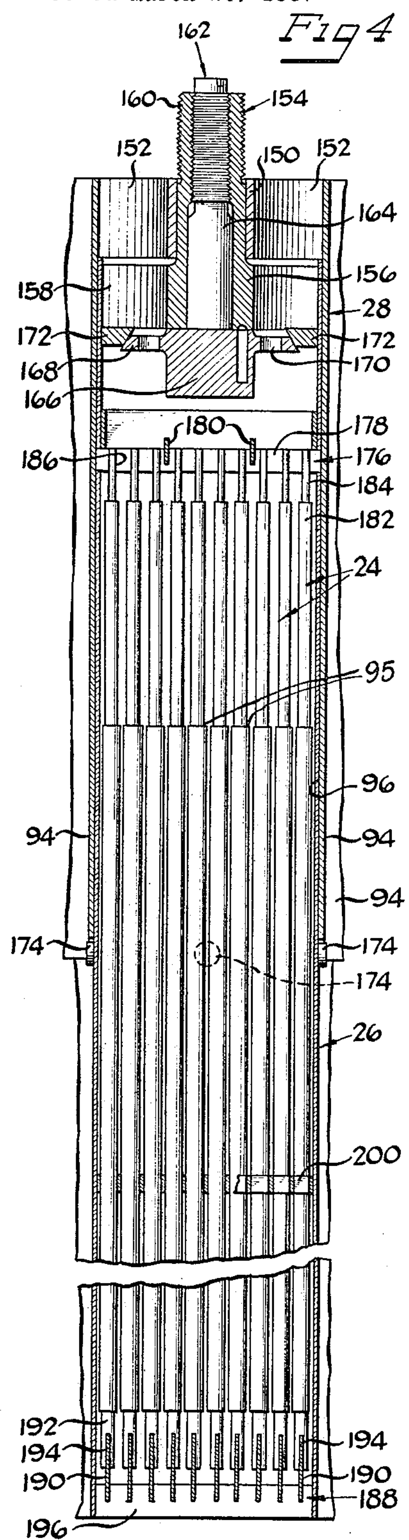
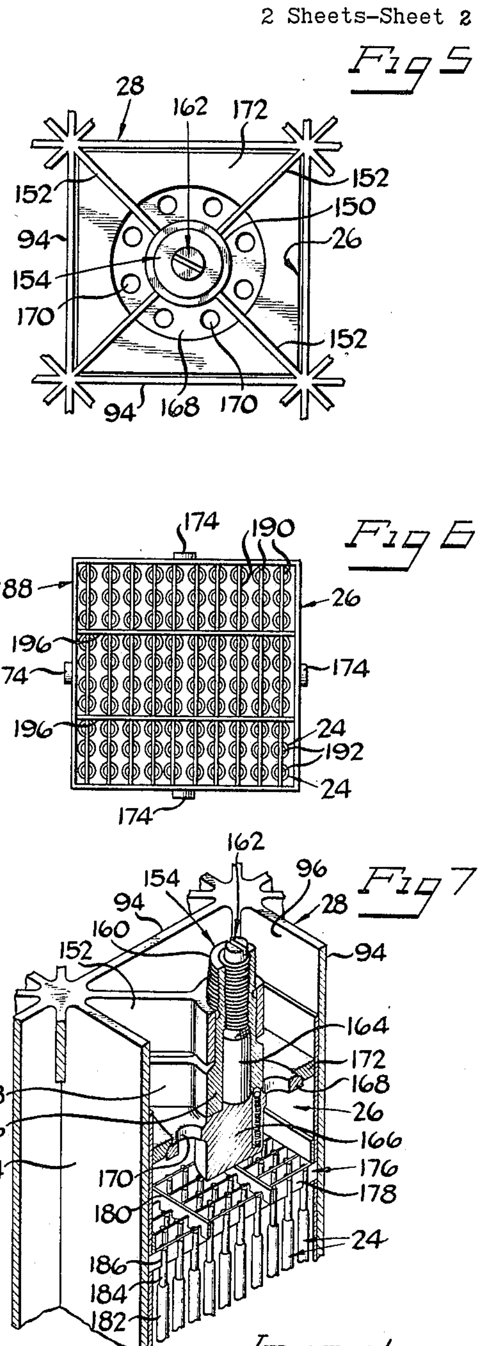
Inventors
PETER FORTESCUE
RAYMOND T. SHANSTROM
By Anderson, Luedeka, Fitch, Even & Tabin
Att'y's

United States Patent Office 3,475,272
Patented Oct. 28, 1969

1

3,475,272
GAS-COOLED FAST REACTOR

Peter Fortescue, Rancho Santa Fe, and Raymond T. Shanstrom, La Jolla, Calif., assignors, by mesne assignments, to Gulf General Atomic Incorporated, San Diego, Calif., a corporation of Delaware

Continuation-in-part of application Ser. No. 374,908, June 15, 1964. This application Mar. 28, 1967, Ser. No. 648,507
Int. Cl. G21c *15/28*
U.S. Cl. 176—40 15 Claims

ABSTRACT OF THE DISCLOSURE

A nuclear power fast reactor system is described which utilizes gas as a coolant. The reactor system includes a prestressed concrete containment vessel which contains the entire primary system of the reactor, comprising the core, control rod drive mechanisms, coolant circulators, steam generators and associated main coolant ducting. The interior of the vessel is separated into two regions, the lower one containing the core and having provision for explosion absorption and water flooding. The core is comprised of fuel elements supported in a plurality of elongated tubes which depend freely from a generally horizontal grid structure. The tubes are secured in the grid structure and mate therewith at their upper ends.

This application is a continuation-in-part of copending application, Ser. No. 374,908, filed June 15, 1964, now abandoned.

The present invention relates generally to nuclear power fast reactor systems and, more particularly, to an improved nuclear power fast reactor system in which gas is utilized as the coolant.

Heretofore, many fast reactor systems that is, reactor systems that operate with neutrons in the fast energy range (i.e., with essentially all neutrons at energies greater than 1 kev. and with the average neutron energy in the hunderd kev. range) have been designed with liquid metal coolants. Liquid metals are very good coolants, and their use is suggested where extremely high power densities characteristic of fast reactors are involved. Even sodium, however, one of the most practical liquid metal coolants, presents certain disadvantages. The principal disadvantages of sodium relate to chemical action, particularly with water and oxygen, induced radioactivity, undesirable interaction with the nuclear design (spectrum softening and effect on temperature coefficients), and solidification at room temperature.

The fast reactor system of the present invention uses helium as the coolant, although other gases may also be used, as discussed more fully below. The term "gas-cooled" and its variants are used herein in a broad sense and include those fluids sometimes referred to under the more restricted term "vapor." Gas cooling obviates the principal disadvantages of a liquid metal coolant, such as sodium, which have been generally noted above. For large reactors, gas cooling confers special advantages of its own in the direction of increased safety, improved conversion ratio, longer intervals between refuelling, greater plant simplicity, and reductions in both fuel and capital costs.

Fast reactors cooled with liquid metals normally are designed for internal conversion ratios somewhat less than unity (in order to maintain relatively high leakage to avoid positive void coefficients). Gas-cooled reactors, on the other hand, are not so limited and may be designed with lower leakage and higher internal conversion ratios. In particular, for large cores (greater than 2000 liters)

2 the internal conversion ratio can be unity or above while still providing adequate space for the coolant. Consequently, a core composition can be chosen such that the reactivity change with lifetime is very small (in particular, less than one dollar) throughout a relatively long interval between refuelling. A further advantage accrues from the smaller leakage made possible by gas cooling. Although the reactivity of fast reactors is strongly dependent on core size (for a fixed fuel mass), the magnitude of the reactivity variation for any fractional change in core volume is smaller for cores with smaller leakage. This, therefore, affords greater safety in design.

Some problems require solution in designing a satisfactory fast reactor system. Among these are the avoidance of a very rapid loss of coolant, and in the provision for safe reactor shut-down upon a loss of coolant over longer periods, for example, a minute or longer. Another problem is in avoiding prompt critical configurations during and after a core meltdown. In a fast reactor system, the geometry of the core and its surroundings and flow direction may be arranged in such a way as to minimize this likelihood. Also secondary containment may be provided which is strong enough to absorb any resulting explosion if a critical mass accumulates anyway. However, this may not be sufficiently safe.

Important, in the design of a fast reactor system, is an appreciation of the strong interaction and interdependence of the different nuclear, geometrical, and thermal properties of the core. This must be considered in order to derive advantages from gas cooling.

It is, accordingly, a principal object of the present invention to provide a novel and improved construction of a nuclear power fast reactor system which utilizes a gas as the coolant.

Another object is to provide a reactor system which combines fuel, coolant, blanket, structural material, and resonance poisons in a novel manner so as to achieve increased safety, increased conversion ratio, longer intervals between refuelling, greater plant simplicity, and reduced power costs.

It is another object of the present invention to provide a novel and improved gas-cooled fast reactor system utilizing a containment vessel which encloses the entire primary system of the reactor, and wherein access to internals is facilitated.

It is a further object of the present invention to provide a gas-cooled fast reactor in which the composition, construction, and arrangement of the fuel elements and the core provided thereby is novel and improved.

It is another object of the present invention to provide a gas-cooled fast reactor in which the fuel elements are not only rigidly supported but are supported in such a manner as to preserve thermal stability.

It is a further object of the present invention to utilize fuel elements, in the type of gas-cooled fast reactor described, which fuel elements have improved heat transfer characteristics and low resistance to coolant flow.

It is still another object of the present invention to provide a novel and improved construction for a gas-cooled fast reactor system which defines a particularly effective coolant flow through the reactor.

A still further object of the present invention is to provide a fast reactor system with enhanced safety characteristics.

An additional object of the present invention is to provide a fast reactor which can safely run for extended periods of time before requiring refuelling, without initially requiring a large amount of excess reactivity.

Another object of the present invention is to provide a fast reactor which is designed so that its reactivity decreases, for any quantity of water or steam addition.

It is also an object of the present invention to provide a simple and economical fast reactor which may function to conserve existing fuel reserves.

Still another object is to provide an improved device for supporting fissile material in a nuclear reactor.

Other objects and advantages of the present invention will become apparent from the following detailed description and the accompanying drawings wherein:

FIGURE 1 is a side sectional view of a portion of a gas-cooled fast reactor system embodying various features of the present invention;

FIGURE 2 is a plan sectional view taken generally along line 2—2 of FIGURE 1;

FIGURE 3 is an enlarged perspective view of a portion of the internal structure of the reactor shown in FIGURES 1 and 2, illustrating in particular the core construction and support;

FIGURE 4 is a further enlarged side view illustrating, in further detail, a portion of the core and support of the reactor shown in FIGURES 1 and 2;

FIGURE 5 is a plan view of the elements shown in FIGURE 4;

FIGURE 6 is a bottom view of the elements shown in FIGURE 4; and

FIGURE 7 is a perspective of the elements shown in FIGURE 4, the structure being partially cut away to illustrate details of internal construction.

Very generally, the invention, which is defined with particularity in the accompanying claims, relates to a gas-cooled fast reactor system. The system comprises a containment vessel 22 which defines an internal compartment 37. A supporting grid 28 is disposed within the internal compartment, and a plurality of elongated open-ended tubes 26 are supported near their upper ends and mate in the interstices or cells 96 of the grid. The tubes are preferably in the form of boxes (i.e., square cross section), but may be of other suitable cross sectional configurations, such as rectangular, triangular, circular, etc. The tubes are for containing fissile material, in the form of fuel elements 24, and extend freely from the grid. As the coolant gas passes through the tubes, it is heated by the heat liberated in the fission reaction of the fissile material.

Also in accordance with the invention and very generally, the gas-cooled fast reactor system may include a containment vessel 22 in which a wall 46 separates the internal compartment 37 into upper and lower regions 48 and 52, respectively. In such case, a reactive core 50 is disposed in the lower region, and coolant circulators 56 and vapor generators 54 may be contained in the upper region. By providing a removable closure 44 in the top 31 of the containment vessel and by providing for the introduction of water into the lower region for flooding same, ready and safe access may be had to the components contained in the upper region. The core may include a sufficient amount of suitable material having high thermal or resonance neutron cross sections as to provide a substantial negative contribution to the reactivity of the core in the event the core becomes flooded with water.

Reactor system construction

Referring now particularly to FIGURES 1 and 2, the entire primary system of the reactor system including the core 50, control rod drive mechanisms 82, circulators 56, steam generators 54 (or other types of vapor generators) and associated main coolant ducting 58, 60 is housed in the prestressed concrete pressure or containment vessel 22.

The illustrated vessel 22 comprises a concrete shell 31 which externally is generally cylindrical with flat ends. The shell 31 includes a generally cylindrical side wall 32, an upper end wall 34, and a lower end wall 36, which define the internal cavity or compartment 37. The shell 31 may be disposed in a cylindrical pit or shaft 38 with the central axis of the vessel vertical and its upper end or face at ground level. The cylindical shell is encircled or surrounded at spaced intervals along its height by individual steel circumferential stressing bands or cables 40. Each of these circumferential cables 40 is disposed in a circle or loop around the cylindrical wall of the shell and means such as remotely operable jacks are provided to independently adjust and continuously measure the strain on each of the circumferential cables. The circumferential cables 40 and the associated adjusting and measurement means are accommodated in a generally cylindrical concrete lining 41 of the pit in the space between the cylindrical shell and the pit.

Elongated vertically extending steel axial stressing cables 42 are disposed in radially aligned pairs and extend the full height of the illustrated vessel. The pairs of axial cables 42 are circumferentially spaced within the wall of the shell 31 as shown best in FIGURE 2. Suitable means are provided for independently adjusting and continuously measuring the strain on the axial stressing cables, which means are operable from the top of the vessel. The illustrated vessel compartment 37 has an inner pressure tight seal lining 62 which is faced with a layer 64 of heat or thermal insulation. Inside the vessel wall adjacent the steel lining 62 are coils 66 which carry cooling water.

It is unlikely that this type of vessel can fail by sudden explosion; rather, it develops leaks, which relieves the pressure until the tensioning cables are able to restore comparative tightness. In other words, in the case of a sudden extreme increase in pressure it is anticipated that the internal pressure tight metal lining and the concrete walls of the shell fracture allowing the initial pressure waves to dissipate through the cracks. This will be permitted by the steel cables, but when the initial pressure surge has subsided, the prestressed cables will contract to draw the fractured concrete together to reachieve containment. It is implicit in this concept that an initial shock wave will sufficiently precede the travel of appreciably radioactive material so the containment can be reachieved before such radioactive material is released, at least in any substantial quantity. The strength of the concrete wall relative to that of the steel cables is selected so that the concrete wall will break down and permit the pressure wave to be relieved without transmitting sufficient force to the cables to cause them to snap or be permanently deformed.

Access to the internal compartment 37 is afforded by a main outer entry passageway 43 through the center of the upper end wall 34. The passageway 43 is normally closed and sealed by a main outer plug or closure 44 removably secured in the passageway. A top dome 45 of steel or like material is removably secured over the entire top end of the vessel 22 and serves as a secondary containment vessel or shield.

In general, the internal compartment 37 formed within the vessel is divided by a transversely extending internal concrete shield or wall 46 into the lower section or region 52 where a core assembly 49 is contained. The wall 46 also divides the internal compartment into the upper section or region 48 where steam-generating apparatus 54 is housed. The circulators 56 cause the helium gas coolant to move through inlet ducts 58 from the upper region 48 down through the internal shield or wall 46 and then down through the core assembly 49. The gas coolant then flows through outlet ducts 60 back up through the internal shield or wall to the upper region 48. The coolant next passes through the steam generating apparatus 54 and finally returns to the circulators 56 to complete its cycle.

The transversely extending internal concrete wall or shield 46 is disposed substantially closer to the lower end of the vessel since in the illustrated reactor construction the steam-generating apparatus 54 occupies a substantially greater volume than does the reactive core construction or bundles. The lower section or region 52 has a smaller diameter than does the upper section or region 48 so that an annular horizontal ledge or shoulder is provided on which the internal wall 46 is disposed.

The internal wall 46 includes a centrally located generally cylindrical internal access passageway 72 in which a mating internal plug or closure 74 is removably received to seal the upper and lower areas from one another. The internal shield and its plug are constructed of concrete or a like material and are provided with thermal insulation across their lower surfaces which face the core assembly 49. The plug 74 provides an upper central open space or zone 76 beneath the plug. A plurality of vertical nozzles 80 extend through the internal plug 74.

The control rod drive mechanism 82 for the reactor is mounted on the upper surface of the internal plug and each of the nozzles 80 is adapted to receive portions of the control rod drive mechanism as well as an elongated control rod member or element 84 which is associated with that nozzle. The nozzles 80 are disposed so that each is located directly above the position in the core assembly 49 of one of the control rod elements 84 for the reactor.

Disposed within the core-containing lower section or region 52 of the vessel is a generally cylindrical thermal shield 86 formed of suitable material such as iron and porous concrete. The cylindrical shield 86 occupies the lower region 52 extending from the bottom of the compartment to the underside of the interior wall 46. A central opening through the shield 86 generally coincides in diameter with the overlying internal access plug 74. The generally cylindrical reactive core assembly 49 is disposed within the upper end of this thermal shield 86 with its upper plane generally level with the upper end of the shield 86 to define with the overlying plug 74 the upper open space 76 immediately above the core assembly. Disposed transversely across the lower end of the cylindrical thermal shield is a wall 88 of thermal insulation, formed of suitable material such as iron and porous concrete, defining between it and the lower end of the core assembly a lower open space 90 for fuel handling and as a receptacle for possible core meltdown.

The core assembly 49, which will be described in detail in a separate section, is comprised of the fuel elements 24, the elongated tubes or boxes 26, the grid structure 28 and a core barrel 92. In general, the grid structure 28, which is supported across the top of the cylindrical barrel 92, is comprised of panels 94 that form cells or interstices 96. Each fuel-containing box 26 is supported in a cell and the boxes extend down into and occupy the core barrel.

As indicated by broken line in FIGURE 1, the depending portions of the fuel elements contained in the boxes provide the central reactive core 50, an outer or radial blanket 98 circumferentially surrounding the core, a lower axial blanket 100 below the core, an upper axial blanket 102 above the core, and a fission product void area or zone 103 above the upper blanket.

Four circumferentially spaced inlet conduits or ducts 58 pass vertically down through the internal wall 46 adjacent its periphery and then turn radially inward to communicate with the upper open space 76. Eight circumferentially spaced outlet conduits or ducts 60 extend radially outward from the lower open space 90 and then vertically upward through the cylindrical thermal shield 86 and the internal wall. Thus, the flow of the helium gas coolant is downwardly through the inlet ducts 58 and into the upper space 76 above the core assembly. The helium gas coolant, which is relatively cool at this point, proceeds downwardly through the grid plate 28 and the core and blankets to the lower open space 90. Heat is transferred to the gas from the core and blankets as the gas passed downwardly through them and the heated gas coolant then passes outwardly and then upwardly through the outlet ducts 60 to the steam generating region located above the internal wall or shield.

The steam generating apparatus 54 of the illustrated reactor 20 includes eight independent steam generating units 104, each incorporating a pair of once-through evaporator economizers 106, a superheater section 108, and a resuperheater section 110. This last resuperheater section 110 is used because an external steam-to-steam heat exchanger (not shown) is employed as for reheat. This arrangement makes for considerable reduction in the bulk of the steam generator housed within the containment vessel and is of advantage in fast reactor systems because the core power density is so high in fast reactors that the vessel size in almost entirely determined by the steam generator bulk. Furthermore, to achieve the desired immunity from sudden coolant loss, it is preferred to keep all steam pressures above that of the coolant. A relatively gas-tight, open cylindrical shield 111 surrounds the steam generating apparatus 54 and circulators 56, and may extend from the lower end of the main outer plug 44 to the top surface of the internal plug 74. This shield will substantially isolates the baffled coolant flow path from the upper region 48 and thus permits access to the upper region while coolant flow is maintained.

The coolant passes upwardly from the outlet ducts 60 between alternate pairs of resuperheaters, then across them and upward again to the superheaters, then to the evaporator-economizers, and finally, to the four circulators 56. Each circulator moves coolant for two of the eight steam generating units. Headers and interconnections are all located within the pressure vessel 22, access being available on shutdown for repair or even for complete replacement of the steam generating apparatus.

The internal wall 46 allows such access (under shutdown conditions) to the steam generating apparatus 54 and also to the control rod drive mechanism 82 through the main entry passageway 44 with or without water flooding of the upper section of the vessel compartment.

One of the two-stage axial compressor-circulators 56 is provided for each of the four inlet ducts 58. Each of the circulators 56 is driven by an integrally-mounted single-stage turbine 112 to pass the full steam supply from a pair of the eight steam generating units 104 to the inlet duct associated with the circulator. As shown in FIGURE 1, each of the circulators is located at the upper end of its associated inlet duct and adjacent to the upper end of the vessel. Each circulator and its turbine is disposed in a compartment 114 accessible from the top of the vessel through an access port 116 ordinarily closed and sealed by a shield plug 118 of concrete or like material. Each circulator and its turbine is controlled from atop the vessel by suitable means 120 that extend vertically through the associated shield plug 118.

The circulators 112 are under coolant pressure internally and externally whereby their casings are relieved of sustained high pressures. This integral turbine-circulator unit offers the advantages that it can be mounted on a single pair of bearings, is sufficiently small to be practically and easily enclosed within the main pressure vessel, and is independent of external power sources.

In a situation where a slow loss-of-coolant occurs, for example, over a period of a minute or longer, the present core's compatibility with water avoids any serious accident. By water-spray injection, followed by flooding if necessary, any credible situation can be dealt with, with no more than natural convection circulation needed to deal with any subsequent long shutdown period.

However, there is no need to invoke water flooding if a timely scram is accomplished and the exponential rate of loss-of-coolant pressure is kept down to a time constant of some 30 seconds or more. The circulators 112, designed for a thirty percent overspeed margin, can cope with this situation with no harm to the core and with nothing but the helium remaining in the primary circuit for cooling.

Both as an aid to reliability and for efficiency and compactness, the circulators are of the integral single-stage series turbine-drive type, dependent only on the steam generated by the associated main boiler section that they serve. Such machines can be made with a 50% over-speed margin, which allow the situation just mentioned to be met with one circulator out of service.

A water tank 121 approximately three-quarters full and containing sufficient water 122 to cool the core 50 in the event of substantial coolant loss is disposed in the upper region 48. The water tank 121 rests on legs on the internal plug 74, or on other suitable means which will permit access to the control rod drive mechanisms 82. Lifting means such as eyebolts 123 are provided at the top of the tank 121 to enable the tank to be lifted out of the internal compartment 37 through the passageway 43 for servicing the steam generating and circulator apparatus. A restricted opening 124 is also located at the top of the tank, admitting gas from the upper region 48 over the water in the tank, thus placing the water in the tank under the same pressure as exists in the upper region 48.

Four dump ducts 125 disposed at the bottom of the water tank 121 communicate with the four coolant inlet ducts 58. A diaphragm 126, capable of rupturing under a preset pressure differential is located in each water duct and retains the water in the tank under normal conditions. Upon loss of pressure in the coolant duct, the diaphragms will rupture admitting water into the coolant ducts and then into the core. The restricted opening 124 has a diameter which permits the required rupturing pressure differential to be built up at a predetermined rate of loss of coolant pressure.

The arrangement for loading and unloading the core assembly is from the bottom by means of a fuel handling machine 127 disposed in the lower open space 90. A bottom-loaded core facilitates the use of an adequately rigid fuel box clamping system (as will be described) that is located in the cool and more uniform temperature above the reactive portion of the core assembly. A bottom-loaded core also obviates the need for removing the control rod drive mechanism and internal shield plug during reloading. It also offers advantages to keep the hot fuel handling zone away from the top face of the reactor. Still further, it provides a large vacant space below the core for meltdown dispersion.

The illustrated fuel handling machine 127 includes what is basically a movable catch pot 128 large enough to receive one of the fuel boxes 26. This movable catch pot 128 incorporates means for lowering the spent fuel boxes into itself as well as for receiving new-fuel boxes from a vertical fuel supply tube 129 leading upwardly through the vessel to an upper surface gas lock 130. The movable catch pot 128 can transport a fuel box laterally and also discharge it downwardly through a vertical spent fuel tube 131 through another gas lock 132 to an external water-filled spent fuel canal 134 located in a central lower end extension 136 of the vessel. Coupling and uncoupling the fuel boxes may be accomplished by the use of an appropriate box spanner mechanism (not shown).

The fuel handling or charging machine 127 is normally stored outside of the reactor vessel in a fuel handling machine room 138 in the lower extension 136, and is movable upwardly through a passageway 140 into the lower open space 90.

Refuelling can be accomplished at amospheric pressure with the reactor top dome 45 open (but the main entry plug 44 in and the circulators 56 operating on air instead of helium at reduced speeds). Alternatively, the operation may be done underwater with both shield plugs 44 and 74 removed giving complete visibility.

The mode of adjusting the individual channel coolant flow in the core is by gagging mechanisms located at the upper entry ends of the fuel boxes. In this case, adjustment may be made directly from the top face of the shield plug 74 by means of coupling shafts concentric with those used for tightening up the fuel box securing nuts.

Core assembly construction

In the illustrated core assembly 49, the cylindrical core barrel 92 is disposed within the cylindrical lower thermal shield 86 with its upper end terminating somewhat below the upper end of that shield. As shown best in FIGURE 3, the lower portion of the generally cylindrical horizontally disposed grid structure 28 has a reduced transverse size to permit it to be received in the upper end of the cylindrical barrel 92 and to provide an annular shoulder which rests upon the upper edge of the barrel to support the grid structure. The grid structure 28 comprises the vertical panels or plates 94 which form an open rectangular egg-carton or cellular construction as shown best in FIGURE 3. The vertical plates 94 define the cells or interstices 96 which have a rectangular shape in plan and are open to provide communication or flow vertically through them between opposite sides of the grid structure. The rectangular cross section of each cell 96 is small relative to the substantial thickness of the grid structure so that the cells are vertically elongated. Each of the cells 96 either permits passage of a control element 84 or releasably and rigidly supports one of the tubes or boxes 26 of fuel elements 24. As will be explained below in further detail, each box 26, which is rectangular in cross section, has a substantial length of its upper end received in and rigidly supported in one of the rectangular cells 96. The remainder of the boxes which depend downwardly within the barrel 92 are not supported by the barrel 92 or any other means.

As shown best in FIGURE 2, twenty-nine of the rectangular cells 96 of the grid structure, which are spaced apart from one another and dispersed laterally through the core assembly, support control rod tubes or boxes adapted to receive control rod elements 84 and allow these control rod elements to be selectively inserted into the core. Of the remaining grid plate cells, the outer or peripheral cells are occupied by fuel boxes that hold outer fuel elements which provide the radial blanket 98, and the center or inner cells are occupied by the fuel boxes that hold center fuel elements which provide the core 50, the axial blankets 100 and 102, and the uppermost void area or zone 103. As shown in FIGURES 1 and 4, the upper plane of the upper blanket 102 is disposed slightly above the lower plane of the grid structure. The element diameter and coolant voidage proportion utilized in the blanket zone need not necessarily be the same as that in the core zone. In particular, the fuel element diameter is preferably larger and the proportion of coolant space smaller in the blanket.

The control rod elements 84 for the illustrated reactor 20 are of boron construction, each worth seventy-five cents in reactivity which is nine percent in reactivity and is considered adequate for shutdown margin, hot-to-cold swing, and burnup requirements. As described above, the whole control rod drive mechanism 82 is contained within the pressure vessel, located above the internal shield, to mitigate against the possibility of rod expulsion. Replacement of the control rod drive mechanism may be readily accomplished with the reactor in the loading condition, i.e., with the top open, with or without water flooding. Each of the illustrated control elements incorporates a follower of low neutron absorption cross section such as iron or stainless steel to reduce the effects of streaming. Streaming, which may be considered the increase in leakage above that of a homogeneously mixed core, is significant from an empty control rod box, being estimated as 0.15 percent in reactivity from a single vacant box which is a significant fraction of the rod reactivity worth.

The illustrated fuel elements 24 are simple round-rod elements that are vertically disposed and have portions providing the core and respective blankets. Each element also has a voided extension at its upper end to provide the void area 103. The upper end of each element in the area of fission product voidage is preferably necked down as shown at 95 in FIGURE 4, in order to strengthen the wall in this region and to minimize the drop in coolant pressure through the grid structure. The elements are of strong canned or clad construction, with the can made of steel or a similar material. The voided extension of each fuel element is designed to receive fission gas to limit the fission gas pressure buildup within the element. The strong round-shaped can of the illustrated fuel element allows the provision of adequate can strength to take the required coolant and fission gas pressure without excessive can thickness. Since the cans must be designed to deal with pressure equalization followed by coolant pressure reduction, so long as the limit of fission gas pressure within the can is less than the coolant pressure, there is no penalty in can thickness in using the voided can design. Further, because the coolant pressure is higher than any fission products pressure, the cladding or can may be designed on a yield rather than a creep basis, which is desirable since the effect of creep is to tighten rather than loosen can fit.

To avoid thermal ratcheting, the fuel in the illustrated fuel elements is slit into short pellets, not illustrated, each anchored to the can locally by a center circumferential groove, also not illustrated. This construction has the advantage that the longitudinal thermal expansion of the fuel becomes much more determinable, being tied to that of the cladding. The fuel pellets may be provided with a center void hole to allow the pellets to swell.

It has been found that a large benefit may be appreciated by the use of fuel element surface roughening as a heat transfer aid. While almost any kind of roughening has long been known to improve heat transfer, until recently most forms of this treatment produced very disproportionately large increase in friction as well. However, the illustrated reactor incorporates a very special type of roughening based on disturbing only the boundary layer in a systematic way, by surface protuberances that are confined to a thin layer only and do not extend into the main coolant stream. These take the form of circumferential lands of only a few thousandths of an inch in square section, spaced a few hundredths of an inch apart along a cylindrical element. Typically, this type of roughening is capable of multiplying in heat transfer by about two for a threefold friction increase. As applied to the fuel element of a nuclear reactor, however, only the hot parts need be roughened so that if desired the element may be designed to approximately double the heat transfer where it is needed for an effective penalty of only about doubling the overall friction. Thus, roughening in this manner reduces the surface area needed, allowing use of fewer larger elements and reducing fuel fabrication costs.

The fuel used in the illustrated reactor 20 is a mixture of uranium and plutonium oxides ($U^{238}$, $Pu^{239}$ and $Pu^{240}$) with plutonium acting as the fuel or primary fissile feed and the uranium as the fertile material.

In general, the $Pu^{239}$ was selected because of its high eta value and $U^{238}$ because of its high fast fission cross section. Also, $U^{238}$ contributes a substantial number of fission neutrons for the illustrated reactor. The use of plutonium from other thermal reactors as primary fissile feed is believed to be essential to the long-range economic justification of fast reactors such as the illustrated reactor 20 which operates so as to maintain a sufficiently hard spectrum to meet the needs of this particular fuel. This oxide fuel is selected with a view to large reactors—1,000 mw. (thermal) and upwards—associated with plants for the economic production of power using modern steam conditions and conforming to the operational requirements of commercial power production. The use of such oxide fuel, which has been relatively thoroughly studied experimentally, is anticipated to provide long burnups in the order of 100,000 mwd./tonne.

As an alternative, thorium ($Th^{232}$) may be used in the blankets for $U^{233}$ production. The interest in producing $U^{233}$ stems from its possible long-term worth as feed for high temperature gas-cooled type thermal near-breeders. However, recognizing the usefulness of fast fission effects in $U^{238}$, it would seem likely that any such converter application should benefit from $U^{238}$ fertile material in the core and thorium in the blanket. It would also be possible to use $U^{235}$ instead of plutonium as the fissile material.

It should be noted that metallic carbide or other exotic ceramic fuels, which may offer increased conversion ratios, may be substituted. Oxide, carbide, phosphide and silicide fuels are of interest because the parasitic capture rate in these elements is low. Among these compounds, the spectrum hardens or softens somewhat as a function of the atomic weight of the light element. Compounds which give higher breeding ratios give lower Doppler coefficients and vice versa. It is unlikely that Doppler coefficients can be accepted that are lower in magnitude than that obtained with oxide fuel, if the Doppler coefficient is deemed necessary as the primary shutdown mechanism. In fact, in this case, it would be likely that additional moderator would be needed to degrade the spectrum further and there would be little reason for choosing a fuel other than oxide. However, the magnitude of the required Doppler coefficient is not yet clear, so there may indeed exist some application for these alternative metallic carbide or ceramic fuels.

The details of construction of a typical fuel-containing tube or box 26 and the associated section of the grid structure 28 are shown in FIGURES 4 through 7. As shown best in FIGURE 4, the upper end of each rectangular cell 96 of the grid plate is provided with a generally cylindrical sleeve or bushing 150. The sleeve 150 is supported in vertically extending disposition centrally of the cell by four diagonal webs or fins 152 which extend radially from the sleeve to the respective corners of the cell. Secured within the central opening of the sleeve 150 is a support member 154. The illustrated support member 154 includes a generally cylindrical vertically extending bushing section 156 which is secured within the sleeve 150 and which extends both upwardly and downwardly therefrom. Extending radially outwardly from the lower end of the bushing section 156 are four webs or fins 158 similarly disposed to the webs or fins 152 of the cell. The upper end 160 of the bushing section 156, which extends above the grid structure, is threaded both internally and externally.

A top support nut 162, which is removably supported by the support member 154, in turn supports the fuel-containing box 26 associated with that cell. More particularly, the top support nut 162 includes a generally cylindrical solid central shaft section 164, the upper end portion of which is threaded and thus received for vertical movement within the upper end 160 of the bushing section 156. The shaft section 164 extends downwardly through the bushing section 156 and is integrally secured at its lower end to an enlarged hub or cone section 166 which has an outwardly extending circular annular flange or orifice plate 168. The flange or plate 168 has its outer edge bevelled upwardly and inwardly and is provided with eight circumferentially spaced circular apertures or openings 170.

Adjacent the open upper end of the rectangular upper end of the box is received in the mating rectangular cell with the support member 154 and the top nut extending down into the open upper end of the box. The rib 172 is thereby supported on the flange 168 with the respective circular bevelled edges in wedgelike contact. The top support nut 162 may be rotated from above to cause it to raise or lower.

As also shown best in FIGURES 4, the fuel box 26 is provided with an external nob or projection 174 at each vertical side wall immediately below the lower plane of the grid structure when the box is mounted. These four nobs 174 of the fuel box engage the lower edge of the vertical plates 94 of the rigid structure which define the associated cell when the top support is tightened to urge the fuel box upwardly. This structure provides firm and rigid support over a substantial length of the upper end portion of the fuel-containing tube or box as well as positive axial location for the box, which features are quite important in the construction of a fast reactor.

At the upper end of the fuel-containing tube or box 26 and spaced below the support rib 172 there is secured, extending transversely across the inside of the box in a generally horizontal plane, an upper spacer frame 176. As shown best in FIGURE 7, the illustrated spacer frame 176 includes ten parallel spacer strips 178 which are secured between an opposed pair of box walls at generally equal intervals along the other two opposed walls of the box. The spacer strips 178 are reinforced by a pair of cross-strips 180 which extend normal to the spacer strips at spaced intervals intermediate the lengths of the spacer strips. The spacer frame 176 is securely supported against axial or vertical movement as well as against transverse or tilting movement. The upper end of each of the fuel elements 24 has a reduced upper hub portion 182 closest to the body of the fuel element and an upper pin or extension 184 of still smaller diameter extending upwardly from the hub portion 182. The upper end of each of the pins 184 is provided with an upper transverse slot 186 in which one of the spacer strips 178 is received in the assembled box.

A similar lower space frame 188 is secured at the lower end of the fuel-containing box 26. The lower spacer frame 188, however, has ten support spacer strips 190 which extend perpendicular or normal to the direction of the spacer strips 178 of the upper spacer frame. The lower ends of the fuel elements each have a reduced diameter lower pin or extension 192 with a lower transverse slot 194 in which one of the lower support spacer strips is received. The lower slots 194 extend transversely to the direction of the upper slots 186 so that, as shown in FIGURE 4, in the assembled fuel-containing box, the individual fuel elements are restrained from any substantial rotation about their own vertical axes. The lower spacer frame 188 includes two cross-strips 196 which, as shown in FIGURES 4 and 6, reinforce and give rigidity to the lower space frame.

As shown in FIGURE 4, intermediate honeycomb spacers 200 of an open egg box construction may be secured in the fuel-containing box at desired intervals intermediate its length to establish and maintain transverse spacing of the fuel elements relative to one another. As an alternative to the illustrated spacers 200, other structures may be used. One such structure, which offers low resistance to coolant flow, comprises a plurality of crossed wires intersecting at, for example, 45° or 60° angles. The wires are strung across the box like the strings of a tennis racquet, and are of streamlined cross section.

The fuel elements are supported vertically by the strips 190 of the lower spacer frame 188 alone. The upper slots 186 may be sufficiently deep to afford some longitudinal expansion and contraction of the fuel elements without the strips 178 being withdrawn from their associated slots 186. Transverse or lateral location of the fuel elements 24 is achieved and maintained by the walls of the box together with the intermediate spacers 200 and the spacer strips 178 and 190 of the upper and lower spacer frames 176 and 188.

Thus, axial location of the fuel elements is confined to a single plane, i.e., at the lower end of the fuel elements, so that bowing of individual elements would be determined by the bowing of the much stiffer box structure acting as a whole. In this connection, as noted above, the fuel elements are not restrained from limited axial movement by the intermediate spacers 200 or by the upper strips 178.

It will be noted that in effect the fuel boxes 26 are held encastre over a substantial portion of their length at the upper ends, which length is located substantially wholly outside of the core 50 and blanket zones or areas. This is accomplished by the extremely rigid grid structure 28. The principle involved is the provision of kinematic support acting over a substantial length of the fuel boxes to allow absence of further support in the heated core regions.

The foregoing structure effectively meets the critical need of fast reactors for not only great rigidity of internal structure but also the application of such rigidity to preserve thermal stability. In this connection the interaction between the very small displacements that go with thermal expansion and the resulting core reactivity changes play a major part in determining the kinetic behavior of the system. Because of this, looseness of assembly could be disastrous and an inept choice of clamping points could produce either positive contributions to temperature coefficients or long delay times, either of which could be quite undesirable. The illustrated structure secures the fuel elements against movement or shake induced by coolant flow or other vibration to an order of dimension change associated with thermal expansion. Furthermore, clamping is such that temperature changes due to power increase always tend to increase the effective fuel pitch, while the associated time delays are kept within bounds set by stability criteria. The increase in fuel pitch with increasing temperature occurs because the portions of each of the boxes or tubes 26 toward the center of the core 50 become hotter than those portions which are away from the core center. Any resultant differential thermal expansion causes an outward displacement of the boxes relative to the core center and each other (because they are supported only at one end). The barrel 92, as may be seen in FIGURES 2 and 3, is spaced from the lower ends of the boxes 26 to permit such displacement.

The illustrated active core 50 has an *L/D* of approximately 0.5 and a volume of approximately 5,000 litres. This core has a near, or just over, unity conversion ratio which aids to maximize the interval between refuelling. This is an important feature, since in fast reactors intervals between refuelling are frequently too short in spite of high total burnup because of the low excess reactivity normally allowed as a matter of safety in fast reactors.

The illustrated core facilitates the attainment of a flat reactivity curve. In the illustrated core, the reactivity will increase slightly with time. Poison rods may be lowered into the core, and thereafter permanently fixed, whenever the core reactivity rises to a prescribed margin. This margin, perhaps one dollar, is chosen to be less than the reactivity which can be controlled by the Doppler coefficient or other prompt activity mechanism giving a negative power coefficient. Rather uniform flattening of the power may be achieved over the life of the core by increasing the ratio of fissile to fertile material as the core radius increases. Since the internal breeding ratio would then vary somewhat with position, this will cause the power distribution to change during irradiation. Preliminary calculations indicate that power shifts during the fuel lifetime for such a fuelling method are not severe and it is anticipated that a radial maximum-to-average power density of 1.3 could be obtained.

Helium has been described as a coolant in the present fast gas-cooled reactor, however, other gaseous coolants such as carbon dioxide, nitrogen, steam, organic vapors, etc. can be used.

The possible accident situation of loss of coolant has already been considered in connection with discussion of the prestressed concrete vessel 22 which totally encloses the entire primary system. Another possible accident situation is where steam or water enters the core from the steam generating apparatus. In order to suppress any reactivity increase resulting from steam in-leak and to also deal with complete water flooding, the illustrated reactor incorporates sufficient resonance absorbers permanently within the core structure to ensure that spectrum softening consequent on water admission always results in reactivity decrease. More particularly, fast reactors are sensitive to any addition of water such as might occur from ruptured steam tubes. Addition of water to a fast reactor core can give either a decrease or an increase in reactivity due to an enhanced resonance absorption in the fertile material or fission products, which tends to decrease reactivity, or due to reduced leakage, which tends to increase reactivity, the latter effect dominates in a freshly fuelled core. The hazard is greatly reduced in the illustrated reactor core because of a high ratio of $U^{238}$ to $Pu^{239}$, and is mitigated further by the strong absorption resonance of $Pu^{240}$. Calculations indicate that the core of the illustrated reactor is safe for any quantity of water by the introduction of the limited amount of resonance absorbers in the core structure. Gadolinium is a particularly effective resonance absorber due to its exceedingly high thermal cross section which is important for high concentrations of water as well as its large cross section in the resonance energy region. Although gadolinium has been described as a particularly useful resonance absorber, other materials or mixtures thereof with similar thermal or resonance properties may be used, such as dysprosium, hafnium, samarium, gadolinium, indium and gold or mixtures thereof.

As previously indicated, the illustrated reactor also includes a water storage means for spray water injection and/or complete flooding of the core bundle in case of a loss of coolant situation. Although water storage inside the reactor pit is illustrated, it is obvious that various other methods of water injection can be used, such as a thermally actuated spray from an external storage source. This is an effective safety measure due to the core compatibility with water arising from its composition and the presence of the resonance absorbers. Additional safety is found in the use of porous material in the thermal shields and elsewhere to partially absorb any blast energy and act as an explosion damping mechanism.

REFERENCE DESIGN

The specifications for a reference design gas-cooled fast reactor for effective and practical operation are as follows:

| | |
|---|---|
| **Prescribed operating conditions:** | |
| Coolant | Helium. |
| Ambient pressure | 68 atm. |
| Entry temperature | 260° C. |
| Outlet temperature | 600° C. |
| Maximum surface temperature | 660° C. (800° C. with hot-spot allowance). |
| Pumping power (core and blanket) | 2.5% of heat output. |
| Internal conversion ratio | 1.0. |
| **Prescribed mechanical features:** | |
| Core volume | 5000 liters. |
| Core *L/D* ratio | 0.50. |
| Axial blanket length | 46 cm. (each). |
| **Derived quantities:** | |
| Fissile loading | 1300 kg. |
| Fuel-element diameter outside (active and blanket sections) | 0.985 cm. |
| Fuel volume-fraction (oxide only) | 39%. |
| Coolant void fraction (in boxes) | 44.3%. |
| Active core length | 116.5 cm. |
| Fission-product void length | 58 cm. |
| Total of fuel-element length | 266.5 cm. |
| **Derived quantities:—Continued** | |
| Effective core diameter | 233 cm. |
| Fraction of rod which is smooth | 0.41 (opt. surface temp.). |
| **Performance:** | |
| Rating | 0.67 mw./kg. fissile. |
| Total power | 1206 mw. thermal (7½% in blankets). |
| Power density | 223 kw./liter (in core). |
| Pressure drop (core and blanket) | 2.8 atm. |
| Max. linear rating | 6000 watts/cm. |
| Reynolds number | $1.2 \times 10^5$. |
| Overall conversion ratio | 1.6. |

GENERAL CONCLUSIONS

It appears possible to achieve all that is required in performance from a fast reactor core with gas cooling, without resort to special refractory materials, excessive pressures, or unduly high pumping-power expenditure. It also appears that for large reactors gas cooling confers special advantages of its own in the direction of improved conversion ratio, increased refuelling intervals, greater plant simplicity, and some easing of safety requirements which tend to result in capital cost savings. The illustrated reactor includes means to deal with water in-leak and suddent coolant loss.

Some particular advantages of the present reactor are:

(a) The normal core temperature distribution is much less uniform with gas cooling, because of the much larger coolant temperature rise used and the poorer local heat-transfer coefficient. The likelihood of a simultaneous complete core melt is therefore less. Also, the coolant velocities being much higher, the removal of core material from its critical configuration within the core is more rapid. This is aided by the rather lower power density going with gas cooling.

(b) The use of a prestressed concrete containment with gas cooling provides very strong protection, particularly against impulsive loads, which are resisted by high wall inertia. Assisted by suitable designed relief to an external storage volume, such a system is well suited to explosion containment.

(c) The absence of the tamping effect of surrounding liquid, and the decoupling of the explosive shocks by the gas spaces within the containment (aided by use of porous material to absorb blast energy), reduce the forces to be sustained.

Various modifications and changes in the illustrated reactor may be made without departing from the spirit and scope of the present invention.

Various features of the present invention are set forth in the following claims.

What is claimed is:

1. A gas-cooled fast reactor system comprising, a containment vessel defining an internal compartment, a substantially rigid grid structure supported within said internal compartment and defining a plurality of cells, a plurality of elongated open-ended tubes supported in said cells and extending freely from said grid structure generally parallel with each other, said grid structure mating with and extending a substantial distance along each of said tubes at one end thereof, fissile material supported within said tubes and comprising a reactive core, and means for establishing a flow of coolant gas through said tubes.

2. A reactor system according to claim 1 wherein said flow establishing means are of a configuration to direct coolant gas flow through said tubes from their supported ends toward the opposite ends, whereby said grid structure is positioned where the coolant is at its lowest temperature.

3. A fast reactor system according to claim 1 wherein said elongated tubes each comprises an elongated open-ended box.

4. A reactor system according to claim 1 wherein said grid structure extends generally horizontally within said internal compartment, and wherein said tubes extend generally vertically downward from said grid structure.

5. A reactor system according to claim 4 wherein said fissile material comprises a plurality of generally vertically disposed elongated fuel elements.

6. A reactor system according to claim 5 wherein at least a portion of the surface of each of said fuel elements is roughened by providing circumferential lands of the order of a few thousandths of an inch in square section and spaced from each other along the fuel element in the order of a few hundredths of an inch.

7. A reactor system according to claim 6 wherein the roughened portions of the surfaces of said fuel elements comprise those portions which become the hottest during operation of the reactor system.

8. A reactor system according to claim 5 including means within said tubes cooperating with said fuel elements to restrain said elements from radial and rotational movement within said tubes.

9. A reactor system according to claim 8 wherein said restraining means comprise a plurality of substantially parallel transverse lower cross members disposed toward the lower end of each tube, said fuel elements having a lower vertical slot in its lower end, said lower cross members being engaged with said lower vertical slots, said restraining means further comprising a plurality of substantially parallel transverse upper cross members disposed toward the upper end of each tube, each of said fuel elements having an upper vertical slot in its upper end, said transverse upper cross members being engaged with said upper vertical slots, said upper and lower cross members being spaced from each other to permit longitudinal expansion of said fuel elements to be accommodated by said slots.

10. A reactor system according to claim 1 including a blanket of fertile material and wherein said core and blanket have an internal conversion ratio of greater than unity, causing a tendency for reactivity to increase with time, and further including a plurality of poison rods and means for successively inserting said rods into said core to periodically compensate for the tendency to increase reactivity.

11. A gas-cooled fast reactor system comprising, a containment vessel defining an internal compartment, a wall separating said internal compartment into an upper region and a lower region, a reactive core disposed in said lower region, means disposed in said upper region for circulating the coolant gas, vapor generating means in said upper region, a grid structure in said lower region and generally horizontally disposed, a plurality of open-ended elongated tubes extending freely from said grid structure and being supported near their upper ends by said grid structure, means for directing the coolant gas through said tubes to said vapor generator means and back to said tubes, and fissile material supported in said tubes for heating said gas.

12. A gas-cooled fast reactor system comprising a containment vessel defining an internal compartment, a wall separating said internal compartment into an upper region and a lower region, a reactive core disposed in said lower region, vapor generating means in said upper region, means for circulating the coolant gas through said core and said vapor generator means for transferring heat from said core to said vapor generator means, removable closure means in the top of said containment vessel providing access to said upper region, and means for introducing water into said lower region for flooding same and said reactive core, said reactive core including a sufficient amount of a suitable material having thermal or resonance cross-sections as to provide a substantial negative contribution to the reactivity of said core in the event that said core becomes flooded with water.

13. A reactor system according to claim 12 wherein said material having thermal or resonance cross-sections comprises gadolinium.

14. A reactor system according to claim 12 wherein said wall comprises a radiation and heat shield.

15. A reactor system according to claim 12 wherein said reactive core is surrounded by a thermal shield, and wherein said wall and said thermal shield include a porous material capable of absorbing a substantial amount of blast energy.

References Cited

UNITED STATES PATENTS

| | | | |
|---|---|---|---|
| 2,961,393 | 11/1960 | Monson | 176—40 X |
| 3,011,962 | 12/1961 | Koch et al. | 176—40 X |
| 3,140,237 | 7/1964 | Peterson et al. | 176—18 |
| 3,149,046 | 9/1964 | Boyd | 176—60 |
| 3,192,121 | 6/1965 | Challender et al. | 176—60 |
| 3,249,507 | 5/1966 | Gondoin et al. | 176—60 X |

REUBEN EPSTEIN, Primary Examiner

U.S. Cl. X.R.

176—38, 60, 76

PO-1050
(5/69)

UNITED STATES PATENT OFFICE
CERTIFICATE OF CORRECTION

Patent No. 3,475,272 Dated October 28, 1969

Inventor(s) Peter Fortescue and Raymond T. Shanstrom

It is certified that error appears in the above-identified patent and that said Letters Patent are hereby corrected as shown below:

Column 1, line 37, insert a comma (,) after "systems".

Column 4, line 22, "seal" should read "steel".

Column 6, line 20, "will" should read "111".

Column 10, line 65, before "upper" insert "fuel-containing box 26 there is secured an inwardly extending annular rib or flange 172, the circular inner edge of which is bevelled outwardly downwardly. When the box 26 is mounted in its cell as shown best in FIGURE 4, the rectangular".

Column 11, line 3, "rigid" should read "grid".

SIGNED AND SEALED
JUN 23 1970

(SEAL)
Attest:

Edward M. Fletcher, Jr.
Attesting Officer

WILLIAM E. SCHUYLER, JR.
Commissioner of Patents